United States Patent Office 3,282,117
Patented Nov. 1, 1966

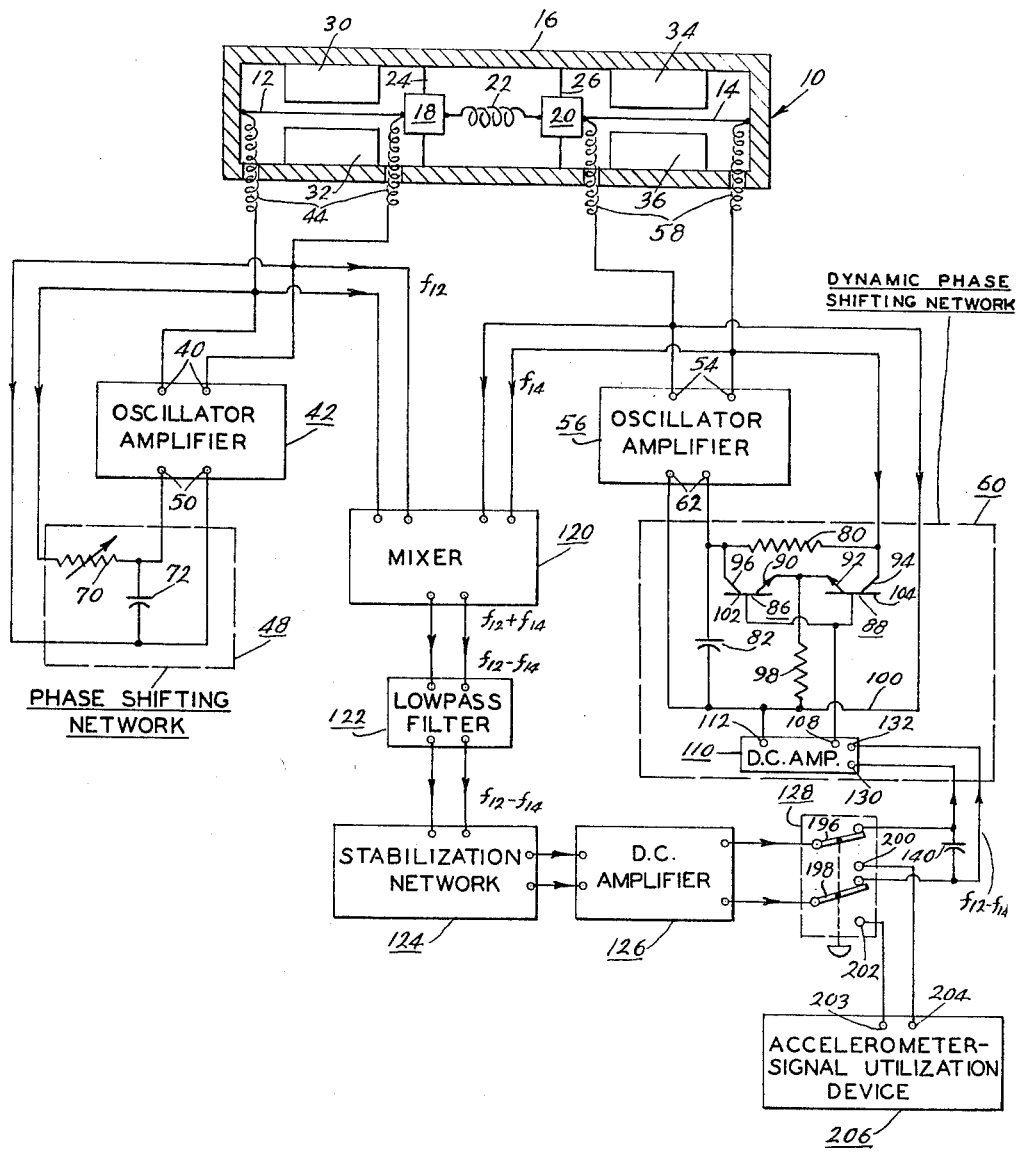

3,282,117
ACCELEROMETER SYSTEM
Stanley R. Sporn, Oceanside, and Robert E. Lockey, Cold Spring Harbor, N.Y., assignors to American Bosch Arma Corporation, Garden City, N.Y., a corporation of New York
Filed Apr. 16, 1964, Ser. No. 360,804
12 Claims. (Cl. 73—517)

The present invention relates to accelerometer apparatus employing two resonators which respond to acceleration to change the frequencies of oscillation thereof, and particularly to apparatus for eliminating undesired changes in said frequencies due to factors other than acceleration.

In a typical use such an accelerometer is mounted in a space vehicle to sense and measure accelerations occurring while the vehicle is maneuvering to alter its path. In many applications such maneuvers are accomplished within relatively short time intervals, e.g. of the order of minutes, and between maneuvers the acceleration is substantially zero.

British Patent No. 789,611 of K. V. Diprose, published January 22, 1958, describes one particular type of accelerometer to which the present invention is applicable. In the latter instrument the tensions in a pair of vibrating string members are changed in opposite senses in proportion to the acceleration of the instrument. These changes in tension cause the natural frequencies of vibration of the vibrating string members to change differentially. The string members are kept in vibration at their natural frequencies by connecting them as the resonators for different oscillator circuits, and the difference in the frequencies of oscillation in the oscillator circuits is used as a measure of the magnitude of the acceleration. However, due to unavoidable minute physical changes in the accelerometer, the frequencies of vibration of the string members for any given acceleration change to some extent with time, and such changes introduce errors in the indications of acceleration. In the usual type of instrument it is attempted to eliminate these errors by manual adjustment of the accelerometer parts so that the natural frequencies of the two vibrating strings are exactly equal when the acceleration is zero. However, when the instrument is to be used for long periods of time it would have to be readjusted frequently to prevent the recurrence of such errors, and this cannot be done manually in an unmanned vehicle.

In accordance with the present invention it has been found that the frequencies of the two oscillators can be compared and automatically modified to maintain the desired relationship between these frequencies. For example, in a preferred embodiment in which it is desired that the frequencies be equal in the absence of acceleration, a signal representing the difference between the oscillation frequencies is derived and utilized as a control signal to alter the phase shift in one of the oscillator circuits in a direction to reduce this difference in frequency to zero. In the usual applications of the invention in which the resonators are to be used to produce acceleration indications, the frequency-controlling circuit is disconnected when proper acceleration indications are desired, so as to permit the resonator frequencies to change appropriately, and a memory device is utilized to maintain the value of control signal derived during the frequency-comparison operation equal to that existing just prior to said disconnection so that the desired corrective phase shift in the oscillator circuit persists during the intervals of acceleration measurement as is required to compensate for the above-described errors and to assure accurate acceleration indications. In a preferred embodiment, one of the oscillators includes as a phase-shift controlling element the emitter-to-collector resistance of one or more transistors, this resistance being varied by changing the transistor base-to-emitter current.

Accordingly it will be seen that the invention takes advantage of the substantial intervals between maneuvers, when acceleration indications are not needed, to provide the above-mentioned automatic correction of the frequency interrelationship of the two resonators, and further provides means for disconnecting the automatic-correcting circuit while maintaining the desired correction effect for the oscillator, merely by operating a switch when acceleration indications are desired, as during maneuvers of the vehicle on which the accelerometer is located.

A more complete understanding of the invention will be obtained by reference to the following detailed description taken in connection with the accompanying figure, which is a schematic diagram illustrating a preferred embodiment of the invention.

Referring to the figure, there is shown therein an accelerometer transducer structure 10 of the above-indicated previously known type, which is normally mounted along with the other apparatus of the figure on a vehicle such as a space vehicle, to provide indications of the acceleration of the vehicle. In this embodiment the accelerometer transducer 10 comprises a pair of vibrating string members 12 and 14 axially aligned with each other in a frame 16, the outer ends of the string members being connected to opposite ends of the frame 16 and the inner ends of the string members 12 and 14 being connected respectively to the masses 18 and 20. The two masses 18 and 20 are mechanically coupled together by a soft spring 22, and are supported transversely of frame 16 by flexible tapes such as 24 and 26.

String member 12 is electrically conducting and is located between magnets 30 and 32; string member 14 is also electrically conducting, and is located between magnets 34 and 36. The output terminals 40 of an oscillator amplifier 42 are connected across the ends of string member 12 by means of appropriate leads 44, and are also connected by way of phase shifting network 48 to the input terminals 50 of oscillator amplifier 42. Similarly, the output terminals 54 of oscillator amplifier 56 are connected by way of appropriate leads 58 to opposite ends of string member 14, and are also connected by a dynamic phase shifting network 60 to the input terminals 62 of oscillator amplifier 56.

It is known that the above-described circuit arrangements, with the two phase shifting networks omitted, will produce an alternating current through each of the string members 12 and 14, that this alternating current in co-operation with the magnetic fields of the magnets 30, 32 and 34, 36 will cause the string members to vibrate, that this vibrating motion of the string members produces voltages across the string members, that the vibration frequencies of the two string members occur at their respective natural, or resonant, frequencies, and that oscillations are thereby produced in each oscillator circuit at the frequency of vibration of its associated string member. The natural frequencies of vibration of the two string members depend upon the tension applied thereto, and these tensions vary with the acceleration of the frame 16. For example, if the frame is accelerated to the right in the figure, the inertia of masses 18 and 20 causes the tension on string member 14 to increase and that on string member 12 to decrease. As a result the natural frequencies of vibration of the two string members change in opposite directions in response to acceleration of frame 16, and the difference in the natural frequencies of the two string members constitutes an indication and a measure of the acceleration of the frame.

Ordinarily the system is intended to be adjusted so that at zero acceleration the natural frequencies of the two string members are equal, producing zero frequency-difference for zero acceleration and an increasing difference frequency for increasing accelerations.

More particularly, it is known that the difference frequency $\Delta f$ in such a system can be expressed as:

$$\Delta f = K_0 + K_1 a + K_2 a^2 + K_3 a^3 \quad (1)$$

where $\Delta f$ = difference $(f_{12} - f_{14})$ in vibration frequencies of string members 12 and 14
$f_{12}$ = vibration frequency of string member 12
$f_{14}$ = vibration frequency of string member 14
$K_0$ = bias term (intended to be constant)
$K_1$ = scale factor
$a$ = acceleration of frame 16 along axis of the string members
$K_2$ and $K_3$ are higher-order constants of small magnitude.

In terms of the above analysis it is the purpose of the embodiment of the invention shown in the figure automatically and continuously to set the bias term $K_0$ equal to zero, which term is normally not zero because of the difficulty of making identical parts for the two vibrating string members and their supports, and because of unavoidable small changes in these parts over a period of time. In arrangements of the prior art, typically the vibration frequency of both string members 12 and 14, at zero acceleration of frame 16, is nominally 5,000 c.p.s.; the value of $K_0$ is 0.25 c.p.s.; the value of $K_1$ is 64 c.p.s./g. and the values of $K_2$ and $K_3$ are not important to this discussion. In the prior art it has typically been necessary to assign a tolerance of 1 c.p.s. to the constant $K_0$ because of the physical improbability of reducing $K_0$ to zero except by accident or due to fortuitous set of coincidences.

In some forms of this general type of accelerometer a finite value of the bias term $K_0$, other than zero, has been purposely designed into the instrument in order to alleviate the possible undesirable "lock in" of the two string members, which could reduce sensitivity of the accelerometer to low accelerations. It has been found, however, that the latter precaution is not necessary under all conditions of operation and that a value of $K_0$ equal to zero has definite advantages in many applications.

In accordance with the present invention, as embodied in the form shown in the figure, the frequency of vibration string member 14 is "servoed" to that of string member 12 during "stand by" intervals when the accelerometer is not being used to measure accelerations, thereby to reduce $K_0$ to zero; and, during "read" intervals when acceleration readings are desired, the "servo" link is interrupted but $K_0$ is maintained at zero by a memory device. Since the "read" intervals during which vehicle maneuvers are accomplished are generally short compared to the "stand by" intervals during which the $K_0$ term is being reduced to zero, the memory device may be a capacitor which is capable of maintaining a constant charge for a relatively long period of time such as five minutes, for example.

More particularly, thus far the arrangement shown in the figure has been described on the basis that each of the oscillators operates at a frequency determined entirely by its associated vibrating-string member. While this is true to a close approximation, we have found that the frequency of either vibrating string member can be adjusted externally to a minor degree by introducing a variable phase shift between the voltage produced across the string member and the input to the corresponding oscillator amplifier and, further, that this phase shift can be varied electronically to provide "servoing" of the frequency of one string member to that of the other. More particularly, the vibrating string member having such a phase shift circuit connected therewith will have its frequency shifted according to the relationship:

$$\delta f = \frac{f}{2Q} \tan \theta \quad (2)$$

where $\delta f$ = the change in frequency due to phase shift
$f$ = oscillator frequency with zero phase shift introduced
$Q$ = Q of the oscillator resonator (in this case the strings)
$\theta$ = phase shift introduced by the phase shift circuit.

Equation 2 can be rewritten as $$\theta = \arctan\left(2Q\frac{\delta f}{f}\right) \quad (3)$$

in order to determine the phase shift required for a desired change in frequency. For example, in a typical case, where $f = 5000$, $Q = 2000$, and $\delta f = 1$ c.p.s., $$\theta = \arctan 4000 \times \frac{1}{5000}$$

$\theta = \arctan(.80) = 39°$ approximately.

Referring now again to the figure, as mentioned above the vibrating string member 12 is connected to the input terminals 50 of oscillator amplifier 42 by way of a phase shifting network 48, and in this example phase shifting network 48 comprises a series resistor 70 and a shunt capacitor 72. The resistor 70 is manually variable in this example so that the frequency of vibration of string member 12 can be manually adjusted as desired over a small range of frequency.

As is also pointed out above, string member 14 is connected to the input terminal 62 of oscillator amplifier 56 by way of a dynamic phase shifting network 60, which is termed "dynamic" to indicate that the phase shift produced thereby is electronically varied and controlled. Dynamic phase shifting network 60 includes a series resistor 80 and a shunt capacitor 82 analogous to resistor 70 and capacitor 72 in phase shifting network 48. However, in addition, resistor 80 is shunted by the series combination of the electrically-controlled emitter-to-collector resistances of transistors 86 and 88. More particularly, the emitter elements 90 and 92 of the two transistors are connected directly together, the collector 94 of transistor 88 is connected to one side of resistor 80, and the collector 96 of transistor 86 is connected to the other end of resistor 80. The common junction of emitters 90 and 92 is connected by way of the resistor 98 to the lead 100 which extends from one of the output terminals of oscillator amplifier 56 to one of the input terminals thereof. The base electrodes 102 and 104 of transistors 86 and 88, respectively, are directly connected together and to the output terminal 108 of a direct current amplifier 110, the other output terminal 112 of which amplifier is connected to lead 100.

In operation of the dynamic phase shifting circuit 60, when the bias current applied to the base electrodes 102 and 104 of the two transistors by D.C. amplifier 110 becomes more positive, both transistors become more highly conductive, i.e. the emitter-to-collector resistances of each of them decreases; for the opposite direction of change of the current of the base electrodes, the emitter-to-collector resistance of the two transistors increases. Accordingly the varying output voltage of D.C. amplifier 110 is effective to change the resistance, and hence the phase shift, encountered by signals fed back from the output to the input of oscillator amplifier 56.

A control signal for application to the input of D.C. amplifier 110 to control its output, and hence the effective resistance of the dynamic phase shifting network 60, is derived in the following manner. The oscillations at the output terminals 40 of oscillator amplifier 42 occurring at the frequency $f_{12}$ of string member 12, and the oscillations at the output of oscillator amplifier 56 occurring at the frequency $f_{14}$ of vibrating string member 14, are both supplied to the input terminals of a mixer 120, which operates on these input signals to produce output signals at the sum and difference frequencies. That is, the output of mixer 120 produces one output signal component at a beat frequency $(f_{12}+f_{14})$, and another output signal component at beat frequency $(f_{12}-f_{14})$. The latter lower-frequency difference signal is then selected by a low-pass filter 122 supplied with the output of mixer 120, the higher frequency $(f_{12}+f_{14})$ being rejected by the filter. The output signal from low-pass filter 122 at frequency $(f_{12}-f_{14})$ is then passed through a conventional servo-system stabilization network 124, through a D.C. amplifier 126, and through a double-pole double-throw switch 128, to the input terminals 130 and 132 of D.C. amplifier 110. In the figure the switch 128 is shown in the position for which it supplies the output of D.C. amplifier 126 directly to the input terminals of D.C. amplifier 110. A memory capacitor 140 is connected across input terminals 130 and 132 of D.C. amplifier 110 for purposes described in detail hereinafter.

In the over-all operation of the system shown in the figure, with switch 128 in the position shown the string member 14 is initially frequency-modulated with a frequency deviation proportional to the signal level and a modulation rate equal to the difference frequency $(f_{12}-f_{14})$. Because the natural frequencies of string members 12 and 14 are initially adjusted to be nearly equal, at some instant of time during the above-described frequency modulation the frequency of vibration of string member 14 will be exactly equal to the frequency $f_{12}$ of string member 12, and the servo-loop described above takes control to produce phase lock between the electrical signals at frequency $f_{12}$ and those at frequency $f_{14}$. After the loop has thus obtained control, any tendency for the frequency of either of the string members 12 and 14 to change with respect to the frequency of the other string member produces a change in the phase relationship between the two input signals from mixer 120, which change is of such nature as to produce a shift in the control voltage applied to D.C. amplifier 110 in a direction and by an amount of keep the frequencies of the two string members exactly equal.

The detailed behavior of the servo circuit by which string member 14 is forced to vibrate at the same frequency as string member 12 is complex and difficult to describe, but, being well known in the art of frequency control systems, need not be set forth here in great detail. It is comparable with certain of the automatic-frequency-control synchronization circuits used in television, for example, one facet of which is discussed in an article "Theory of AFC Synchronization" by Gruen, published in the Proceedings of the IRE for August 1953. Briefly, and without benefit of mathematical justification and analysis, the operation of the circuit may be explained as follows. Assuming the string members 12 and 14 initially to be vibrating very nearly, but not exactly, at the same frequency, the mixer 120 and filter 122 (which in effect comprise a phase-sensitive demodulator) produce an output signal having a component equal to the difference frequency $(f_{12}-f_{14})$. Since this difference frequency is typically of the order of fractions of a cycle, corresponding to a period measured in seconds or even minutes, the output of the low-pass filter 122 can be pictured as a D.C. signal of slowly-varying magnitude. This slowly-varying D.C. signal is applied to the input of D.C. amplifier 110 of dynamic phase shifting network 60 and causes the frequency of string member 14 to sweep through a region near the frequency $f_{12}$, and to approach the latter frequency. As the frequency $f_{14}$ approaches $f_{12}$, the period of variation of the difference-frequency output signal from low-pass filter 122 increases and the phase shift provided by phase shifter 60 changes at a slower and slower rate. When the frequency $f_{14}$ is exactly equal to $f_{12}$, the output of filter 122 has a magnitude proportional to the cosine of the phase difference between the two input signals to mixer 120, and since the frequency $(f_{12}-f_{14})$ equals zero the signal output from filter 122 assumes that constant value which keeps $f_{14}$ equal to $f_{12}$. Accordingly the control voltage developed across memory capacitor 140 and applied to the input terminals of D.C. amplifier 110 is exactly the value required to adjust the phase shift in phase shifter 60 to that value required for exact equality of frequency of vibration of the two string members.

In a typical application of the invention to use in a vehicle travelling in space, the acceleration of the vehicle and of the accelerometer is zero except during short intervals when maneuvering of the vehicle is accomplished, as by short bursts of rocket firing. Accordingly the switch 128 is maintained in the "stand by" position shown in the figure during such intervals of zero acceleration, and automatically supplies the necessary control voltage to dynamic phase shifting network 60 to produce the above-indicated equality of the frequencies $f_{12}$ and $f_{14}$. Now when, as during intervals of maneuvering of the vehicle, it is desired to provide indications of the magnitude of the acceleration of the vehicle, the switch 128 is thrown to its downward position by manual or automatic means, so that the switch arms 196 and 198 thereof are disconnected from across capacitor 140 and from the input of dynamic phase shifting network 60, and instead are connected respectively to switch terminals 200 and 202. The latter terminals are directly connected to the input terminals 203 and 204 of an accelerometer-signal utilization device 206, which may comprise a frequency-sensing circuit and indicator or computer and which may be utilized to monitor or control the maneuvering of the vehicle. With switch 128 thrown to this downward position, the feedback servo loop for maintaining the frequencies $f_{14}$ and $f_{12}$ equal is opened, so that the frequencies of the string members may vary differentially to provide a difference-frequency signal indicative of the magnitude of the acceleration. The system then acts to supply the accelerometer-signal utilization device 206 with an acceleration-indicating signal described by Equation 1 above, and at the same time the accelerometer zero-adjustment bias error indicated by $K_0$ in the latter equation is maintained at zero by the capacitor 140, which retains its charge and hence retains across it a control voltage for application to phase shifter 60 which is the same as that applied thereto immediately before actuation of switch 128. Capacitor 140 therefore serves as a memory device to "memorize" the voltage applied to it during the "stand by" intervals until the "read" intervals are terminated by returning the switch 128 to its upward position. When the "read" interval is over, as when the maneuvering of the vehicle is completed, switch 128 is returned to the position shown in the figure and the system resumes its servo operation, automatically adjusting the control voltage to the phase shifter 60 so as to maintain identity between the frequencies $f_{12}$ and $f_{14}$.

When switch 128 is actuated to its downward position during "read" intervals, the output of low-pass filter 122 thereby supplied to the input terminals of accelerometer signal utilization device 206 is a sine-wave of voltage alternating at the frequency $f_{12}-f_{14}$, which typically has a value of from zero to 600 c.p.s. or more. In the "stand by" condition with switch 128 in its upward position, the output of low-pass filter 122 applied to capacitor 140 and thence to dynamic phase shifting network 60 may go through several cycles of oscillation, but will eventually settle out as a steady D.C. control signal with zero frequency.

In order to provide sufficient memory time for the capacitor 140, its discharge time with switch 128 actuated to its downward position should be relatively long, and at least as long as the "read" interval during which indications of acceleration are derived and utilized. To provide this, the D.C. amplifier 110 preferably has a high input resistance, typically of the order of several thousand megohms. Amplifiers known as electrometer amplifiers are suitable for this purpose, are well known, and are readily available. Solid-state amplifiers generally classified as having parametric input circuits are also suitable for this purpose. Capacitor 140 preferably also has low leakage in order to maintain its voltage during the "read" intervals, and one model of capacitor utilized for this purpose was a three microfarad polystyrene capacitor; various types of low-leakage, low dielectric absorption capacitors suitable for this application are known in the art and readily available. Utilizing such types of capacitor and D.C. amplifier, the memorized correction signal across capacitor 140 is readily maintained for at least the several minutes during which maneuvers are typically completed.

While the invention has been described with particular reference to specific embodiments thereof in the interests of complete definiteness, it will be understood that it may be embodied in any of a large variety of diverse forms without departing from the spirit and scope of the invention as defined by the appended claims.

We claim:

1. Accelerometer apparatus comprising:
   a pair of oscillators each having a different resonator for controlling its frequency of oscillation, said resonators being responsive to changes in acceleration thereof to vary the frequencies of said oscillators differently;
   at least one of said oscillators having a frequency control circuit responsive to signals supplied to a control terminal thereof to vary the frequency of oscillation of said one oscillator;
   means for comparing the frequencies of said oscillators to produce a control signal in response to departures of said frequencies from a predetermined relationship between them; and
   means for applying said control signal to said control terminal of said frequency control circuit to alter the frequency of said one oscillator in a direction to reduce said departure substantially to zero, thereby automatically to maintain said predetermined relationship.

2. The apparatus of claim 1, in which said comparing means comprises a phase detector for producing a control signal indicative of the phase difference between said oscillations from said pair of oscillators, thereby to maintain the frequencies of said oscillators exactly equal.

3. The apparatus of claim 2 in which said comparing means comprises a mixer supplied with oscillations from said oscillators and a low-pass filter supplied with the output of said mixer.

4. The apparatus of claim 1, in which said frequency control circuit comprises electrically-controllable phase shifting means controlled by said control signal for varying said frequency of said one oscillator.

5. Apparatus in accordance with claim 4, in which said phase shifting means comprises an electronic variable-resistance element for varying the phase shift in said phase shifting means.

6. Apparatus in accordance with claim 5, wherein said electronic variable-resistance element comprises a transistor responsive to said control signal applied to its base electrode to vary the resistance between the emitter and the collector electrodes thereof.

7. Apparatus in accordance with claim 1, in which each of said resonators comprises a vibrating string member and said comparing means comprises a circuit for producing output signals at a frequency equal to the difference in frequency of vibration of said vibrating string members, thereby to cause said oscillators to operate at the same frequency.

8. Apparatus in accordance with claim 1, comprising switch means actuatable to disconnect said comparing means from said frequency controlling circuit, whereby said control signal is caused to represent said acceleration and said oscillation frequencies are permitted to change as a function of said acceleration when said switch means is actuated.

9. Apparatus in accordance with claim 8, comprising memory means for maintaining said frequency-controlling circuit in the condition thereof existing immediately prior to said actuation of said switch means.

10. Apparatus in accordance with claim 9, in which said memory means comprises capacitive means having a long discharge time constant when said switch means is actuated.

11. Accelerometer apparatus comprising:
    a first oscillator comprising a first amplifier, a controllable phase shifting circuit for supplying output of said amplifier to the input terminals of said amplifier in variable phase as determined by the phase shift in said circuit, and a first vibrating string member connected to said amplifier to maintain the frequency of oscillation of said oscillator at substantially the natural frequency of vibration of said member while permitting some degree of variation thereof in response to changes in said phase shift, said circuit having a control terminal responsive to different control voltages applied thereto to produce different phase shifts in said circuit;
    a second oscillator comprising a second amplifier and a second vibrating string member for maintaining the frequency of oscillation of said second oscillator substantially at the natural frequency of vibration of said second member;
    a frame supporting said first and second vibrating means so that for a zero value of acceleration of said frame the vibration frequencies of said members are substantially equal, while for increasing values of said acceleration the difference between said vibration frequencies of said first and second members increases;
    means for deriving a frequency-difference signal comprising a voltage varying in accordance with said difference in vibration frequencies;
    means for applying said frequency-difference signal to said control terminal as a control voltage in a polarity to urge said vibration frequency of said first vibrating member toward that of said second vibrating member, said last-named means also comprising switch means actuatable to prevent application of said frequency-difference signal to said control terminal; and
    capacitive means connected to said control terminal for maintaining at said control terminal substantially the same voltage applied thereto just prior to actuation of said switch means.

12. Apparatus in accordance with claim 11, in which said phase shifting circuit comprises a resistor, a pair of transistors of like conductivity-type having their emitter electrodes connected together, their collector electrodes connected to opposite ends of said resistor, and their base electrodes connected to said control terminal.

References Cited by the Examiner

UNITED STATES PATENTS 2,828,419  3/1958  Gruen _____ 331—18 X
3,122,024  2/1964  Trachtenberg _____ 73—517

RICHARD C. QUEISSER, *Primary Examiner.*

JAMES J. GILL, *Examiner.*